United States Patent
Okuno et al.

(10) Patent No.: US 12,099,935 B2
(45) Date of Patent: Sep. 24, 2024

(54) TECHNICAL KNOWLEDGE PREDICTION APPARATUS, METHOD, AND PROGRAM

(71) Applicant: SHOWA DENKO K.K., Tokyo (JP)

(72) Inventors: Katsuki Okuno, Tokyo (JP); Yoshishige Okuno, Tokyo (JP); Shimpei Takemoto, Tokyo (JP); Takuya Minami, Tokyo (JP); Masamichi Kitano, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 736 days.

(21) Appl. No.: 17/292,493

(22) PCT Filed: Nov. 22, 2019

(86) PCT No.: PCT/JP2019/045832
§ 371 (c)(1),
(2) Date: May 10, 2021

(87) PCT Pub. No.: WO2020/110953
PCT Pub. Date: Jun. 4, 2020

(65) Prior Publication Data
US 2022/0019906 A1    Jan. 20, 2022

(30) Foreign Application Priority Data
Nov. 28, 2018    (JP) .................................. 2018-221982

(51) Int. Cl.
*G06N 5/02*    (2023.01)
*G06N 20/00*    (2019.01)

(52) U.S. Cl.
CPC ............... *G06N 5/02* (2013.01); *G06N 20/00* (2019.01)

(58) Field of Classification Search
CPC .............................. G06N 5/022; G06N 20/00
See application file for complete search history.

(56) References Cited

U.S. PATENT DOCUMENTS 5,414,798 A    5/1995    Nigawara et al.
2004/0205040 A1    10/2004    Yoshioka et al.
(Continued)

FOREIGN PATENT DOCUMENTS

CN    101501689    8/2009
JP    H04-52221    2/1992
(Continued)

OTHER PUBLICATIONS

International Search Report mailed on Feb. 10, 2020 with respect to No. PCT/JP2019/045832.
(Continued)

*Primary Examiner* — Eric Nilsson
(74) *Attorney, Agent, or Firm* — IPUSA, PLLC

(57) ABSTRACT

Technical knowledge which is difficult for the expert to express in words or numerical form is predicted and reproduced. A technical knowledge prediction apparatus according to one embodiment of the present invention includes a problem setting unit configured to automatically create and set a problem which includes a control factor of a manufacturing step, and a variable of the control factor, an answer acquiring unit configured to acquire an answer with respect to the problem and indicating a decision of the manufacturing step, a query acquiring unit configured to acquire a query, and a prediction output unit configured to predict and output an answer corresponding to the query acquired by the query acquiring unit, based on a corresponding relationship between the problem and the answer.

18 Claims, 10 Drawing Sheets

| ELEMENT | ADDED CONTENT [wt%] |
|---|---|
| Si | 9.420 |
| Fe | 0.472 |
| Cu | 0.012 |
| Mn | 0.060 |
| Mg | 0.705 |
| Cr | 0.449 |
| Ni | 0.338 |
| Zn | 0.612 |
| Ti | 0.105 |
| Pb | 0.019 |
| Sn | 0.076 |
| Bi | 0.987 |
| Zr | 0.035 |

CASTING PREDICTIONS

| RANK | PROBABILITY |
|---|---|
| ◎ | 0.0000 |
| ○ | 0.1116 |
| △ | 0.8883 |
| × | 0.0002 |

PREDICT

CHANGE CASTING CONDITIONS

| TAPPING TEMPERATURE (°C) | CASTING TEMPERATURE (°C) | CASTING FLOW RATE (mm/min) | COOLANT FLOW (m³/min) |
|---|---|---|---|
| +30.0 | +10.0 | +40.0 | +0.5 |

(56) References Cited

U.S. PATENT DOCUMENTS

2017/0046625 A1    2/2017  Takaai
2017/0103103 A1*   4/2017  Nixon ................. G06F 16/2452

FOREIGN PATENT DOCUMENTS

| JP | 2786218     | 8/1998  |
|----|-------------|---------|
| JP | 2002-304206 | 10/2002 |
| JP | 2004-287577 | 10/2004 |
| JP | 2004-334841 | 11/2004 |
| JP | 2010-277157 | 12/2010 |
| JP | 2012-118830 | 6/2012  |
| WO | 2016/051338 | 4/2016  |

OTHER PUBLICATIONS

Mengliao Wang et al: "Capturing Expert Knowledge for Automated Configuration Fault Diagnosis", Program Comprehension (ICPC), 2011 IEEE 19th International Conference on, IEEE, Jun. 22, 2011 (Jun. 22, 2011), pp. 205-208, XP031912463, DOI: 10.1109/ICPC.2011.24 ISBN: 978-1-61284-308-7.

Haoyong LV et al: "Machine Learning Methods and Their Application Research", Intelligence Information Processing and Trusted Computing (IPTC), 2011 2nd International Symposium on, IEEE, Oct. 22, 2011 (Oct. 22, 2011), pp. 108-110, XP032074308, DOI: 10.1109/IPTC.2011.34 ISBN: 978-1-4577-1130-5.

Qin Liang et al., "Fault diagnosis and maintenance technology of electronic equipment", Beijing: Beihang University Press, Apr. 2018.

* cited by examiner

FIG.5

420 PROBLEM-ANSWER DB

| PROBLEM | CONTROL FACTOR 1 (MATERIAL) | VARIABLE OF CONTROL FACTOR 1 | CONTROL FACTOR 2 (MATERIAL) | VARIABLE OF CONTROL FACTOR 2 | CONTROL FACTOR 3 (MANUFACTURING PROCESS) | VARIABLE OF CONTROL FACTOR 3 | CONTROL FACTOR 4 (MANUFACTURING PROCESS) | VARIABLE OF CONTROL FACTOR 4 | ANSWER |
|---|---|---|---|---|---|---|---|---|---|
| PROBLEM 1 (DECISION OF CASTING) | Si | ○○% | Cu | △△% | MOLTEN METAL TEMPERATURE | ○○○°C | | — | CASTING POSSIBLE |
| PROBLEM 2 (DECISION OF CASTING) | Si | □□% | Cu | ××% | MOLTEN METAL TEMPERATURE | △△△°C | | — | CASTING NOT POSSIBLE |
| PROBLEM 3 (DECISION OF FORGING) | Si | ○○% | Cu | △△% | | — | MOLD TEMPERATURE | ×××°C | FORGING NOT POSSIBLE |

FIG.6

600 PREDICTION EXAMPLE OF DECISION OF MANUFACTURE

| QUERY | CONTROL FACTOR 1 (MATERIAL) | VARIABLE OF CONTROL FACTOR 1 | CONTROL FACTOR 2 (MATERIAL) | VARIABLE OF CONTROL FACTOR 2 | CONTROL FACTOR 3 (MANUFACTURING PROCESS) | VARIABLE OF CONTROL FACTOR 3 | CONTROL FACTOR 4 (MANUFACTURING PROCESS) | VARIABLE OF CONTROL FACTOR 4 | ANSWER |
|---|---|---|---|---|---|---|---|---|---|
| DECISION OF CASTING | Si | ○○% | Cu | △△% | MOLTEN METAL TEMPERATURE | ○○○°C | - | - | CASTING POSSIBLE |
| DECISION OF FORGING | Si | ○○% | Cu | △△% | - | - | MOLD TEMPERATURE | ×××°C | FORGING NOT POSSIBLE |

→ DECISION OF MANUFACTURE: NOT POSSIBLE

FIG.9

| ELEMENT | ADDED CONTENT [wt%] |
|---|---|
| Si | 9.420 |
| Fe | 0.472 |
| Cu | 0.012 |
| Mn | 0.060 |
| Mg | 0.705 |
| Cr | 0.449 |
| Ni | 0.338 |
| Zn | 0.612 |
| Ti | 0.105 |
| Pb | 0.019 |
| Sn | 0.076 |
| Bi | 0.987 |
| Zr | 0.035 |

◎
○
△
×

| CHANGE CASTING CONDITIONS | | | |
|---|---|---|---|
| TAPPING TEMPER- ATURE (°C) | CASTING TEMPER- ATURE (°C) | CASTING FLOW RATE (mm/min) | COOLANT FLOW (m³/min) |
| +30.0 | +10.0 | +40.0 | +0.5 |

FIG.10

| ELEMENT | ADDED CONTENT [wt%] |
|---|---|
| Si | 9.420 |
| Fe | 0.472 |
| Cu | 0.012 |
| Mn | 0.060 |
| Mg | 0.705 |
| Cr | 0.449 |
| Ni | 0.338 |
| Zn | 0.612 |
| Ti | 0.105 |
| Pb | 0.019 |
| Sn | 0.076 |
| Bi | 0.987 |
| Zr | 0.035 |

CASTING PREDICTIONS

| RANK | PROBABILITY |
|---|---|
| ◎ | 0.0000 |
| ○ | 0.1116 |
| △ | 0.8883 |
| × | 0.0002 |

PREDICT

CHANGE CASTING CONDITIONS

| TAPPING TEMPERATURE (°C) | CASTING TEMPERATURE (°C) | CASTING FLOW RATE (mm/min) | COOLANT FLOW (m³/min) |
|---|---|---|---|
| +30.0 | +10.0 | +40.0 | +0.5 |

TECHNICAL KNOWLEDGE PREDICTION APPARATUS, METHOD, AND PROGRAM

TECHNICAL FIELD

This application is based upon and claims priority to Japanese Patent Application No. 2018-221982, filed on Nov. 28, 2018, the entire contents of which are incorporated herein by reference.

The present invention relates to technical knowledge prediction apparatuses, methods, and programs.

BACKGROUND ART

Conventionally, during processes of manufacture, such as development of materials, development of manufacturing processes, and plant operations, design of materials, design of manufacturing processes, setting of operating conditions, or the like are often performed based on experiences of engineers. In particular, an engineer involved in a certain technical field for many years and having a very high proficiency therein (hereinafter also referred to as an "expert") is becoming an indispensable human resource in the certain technical field.

There are studies on methods and systems for inheriting technical knowledge of the experts to the next generation (Patent Documents 1, 2, and 3).

PRIOR ART DOCUMENTS

Patent Documents

Patent Document 1: Japanese Laid-Open Patent Publication No. 2002-304206
Patent Document 2: Japanese Laid-Open Patent Publication No. 2010-277157
Patent Document 3: Japanese Laid-Open Patent Publication No. 2012-118830

DISCLOSURE OF THE INVENTION

Problem to be Solved by the Invention

However, in a case where the technical knowledge learned by the expert includes intuition or the like which is difficult to express in words or numerical form, even for the expert, the expert will not know how to express and hand down the technical knowledge to others. For this reason, the technical knowledge which is difficult to express in words or numerical form by the expert, is difficult to reproduce when inheriting the technical knowledge.

Accordingly, one object of the present invention is to predict and reproduce the technical knowledge which is difficult for the expert to express in words or numerical form.

Means of Solving the Problem

The present invention may include the following configuration.

[1] A technical knowledge prediction apparatus comprising:
a problem setting unit configured to automatically create and set a problem which includes a control factor of a manufacturing step, and a variable of the control factor;
an answer acquiring unit configured to acquire an answer with respect to the problem and indicating a decision of the manufacturing step;
a query acquiring unit configured to acquire a query; and
a prediction output unit configured to predict and output an answer corresponding to the query acquired by the query acquiring unit, based on a corresponding relationship between the problem and the answer.

[2] The technical knowledge prediction apparatus as recited in [1], wherein the problem setting unit determines a value of the variable of the control factor.

[3] The technical knowledge prediction apparatus as recited in [1] or [2], wherein the corresponding relationship between the problem and the answer is a trained model generated by a machine learning using the problem set by the problem setting unit and the answer acquired by the answer acquiring unit as training data.

[4] The technical knowledge prediction apparatus as recited in any one of [1] to [3], wherein the prediction output unit outputs a prediction of a decision of manufacture based on a plurality of predicted answers.

[5] The technical knowledge prediction apparatus as recited in any one of [1] to [4], wherein, when the answer indicates that the manufacturing step can be performed if the variable of the control factor is changed, the prediction output unit displays a predicted variable which enables the manufacturing step to be performed.

[6] A method to be executed by a computer, comprising the steps of:
automatically creating and setting a problem which includes a control factor of a manufacturing step, and a variable of the control factor;
acquiring an answer with respect to the problem and indicating a decision of the manufacturing step;
acquiring a query; and
predicting and outputting an answer corresponding to the query acquired by the query acquiring unit, based on a corresponding relationship between the problem and the answer.

[7] A program for causing a computer to function as:
a problem setting unit configured to automatically create and set a problem which includes a control factor of a manufacturing step, and a variable of the control factor;
an answer acquiring unit configured to acquire an answer with respect to the problem and indicating a decision of the manufacturing step;
a query acquiring unit configured to acquire a query; and
a prediction output unit configured to predict and output an answer corresponding to the query acquired by the query acquiring unit, based on a corresponding relationship between the problem and the answer.

Effects of the Invention

According to the present invention, it is possible to predict and reproduce the technical knowledge which is difficult for the expert to express in words or numerical fault.

BRIEF DESCRIPTION OF DRAWINGS

FIG. 5 is a diagram illustrating an example of data stored in a problem-answer database according to one embodiment of the present invention.

FIG. 6 is a diagram illustrating a prediction example of a decision of manufacture according to one embodiment of the present invention.

FIG. 9 illustrates an example of a screen displayed on an expert terminal according to one embodiment of the present invention.

FIG. 10 illustrates an example of a screen displayed on a novice terminal according to one embodiment of the present invention.

MODE OF CARRYING OUT THE INVENTION

Figure 1:
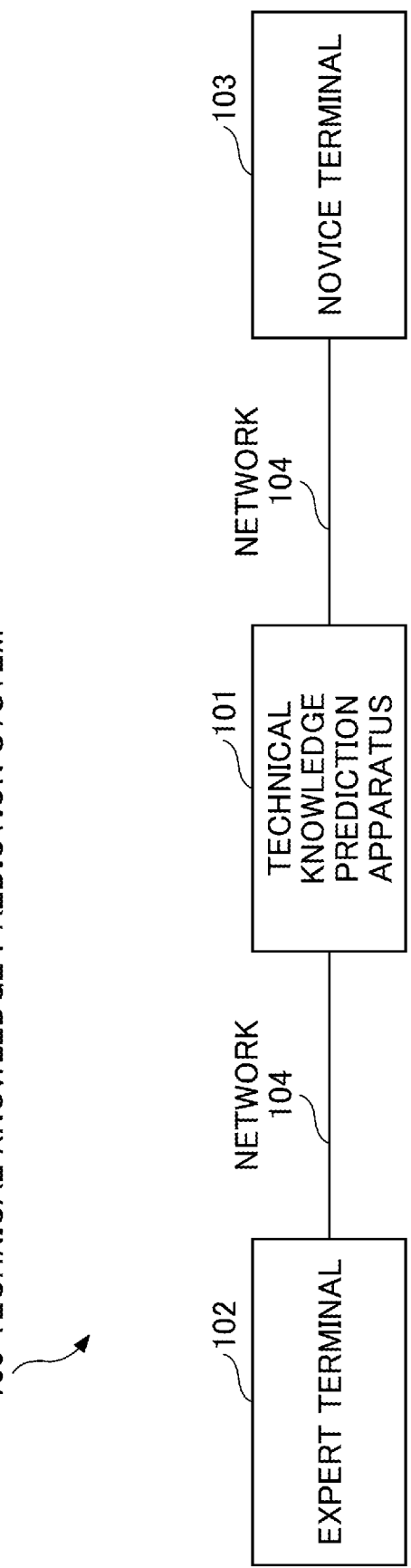
FIG. 1 is a diagram illustrating an overall system configuration including a technical knowledge prediction apparatus according to one embodiment of the present invention.

Hereinafter, each of embodiments will be described with reference to the accompanying drawings. In this specification and the drawings, constituent elements having substantially the same function or configuration are designated by the same reference numerals, and a repeated description thereof will be omitted.

In this specification, a case where the technical knowledge for determining the design of materials and manufacturing processes (that is, the condition), which can determine whether or not each manufacturing step can be performed, is predicted and reproduced for the manufacture of an alloy material, for example, however, the present invention may be applied to various techniques not only for the manufacture of the alloy material but also for all of the manufacturing steps.

FIG. 1 is a diagram illustrating an overall system configuration including a technical knowledge prediction apparatus 101 according to one embodiment of the present invention. A technical knowledge prediction system 100 may include the technical knowledge prediction apparatus 101, an expert terminal 102, and a novice terminal 103. The technical knowledge prediction apparatus 101 may transmit data to and receive data from the expert terminal 102 via an arbitrary network 104. In addition, the technical knowledge prediction apparatus 101 may transmit data to and receive data from the novice terminal 103 via the arbitrary network 104. Hereinafter, each of these elements will be described with reference to FIG. 2.

Figure 2:
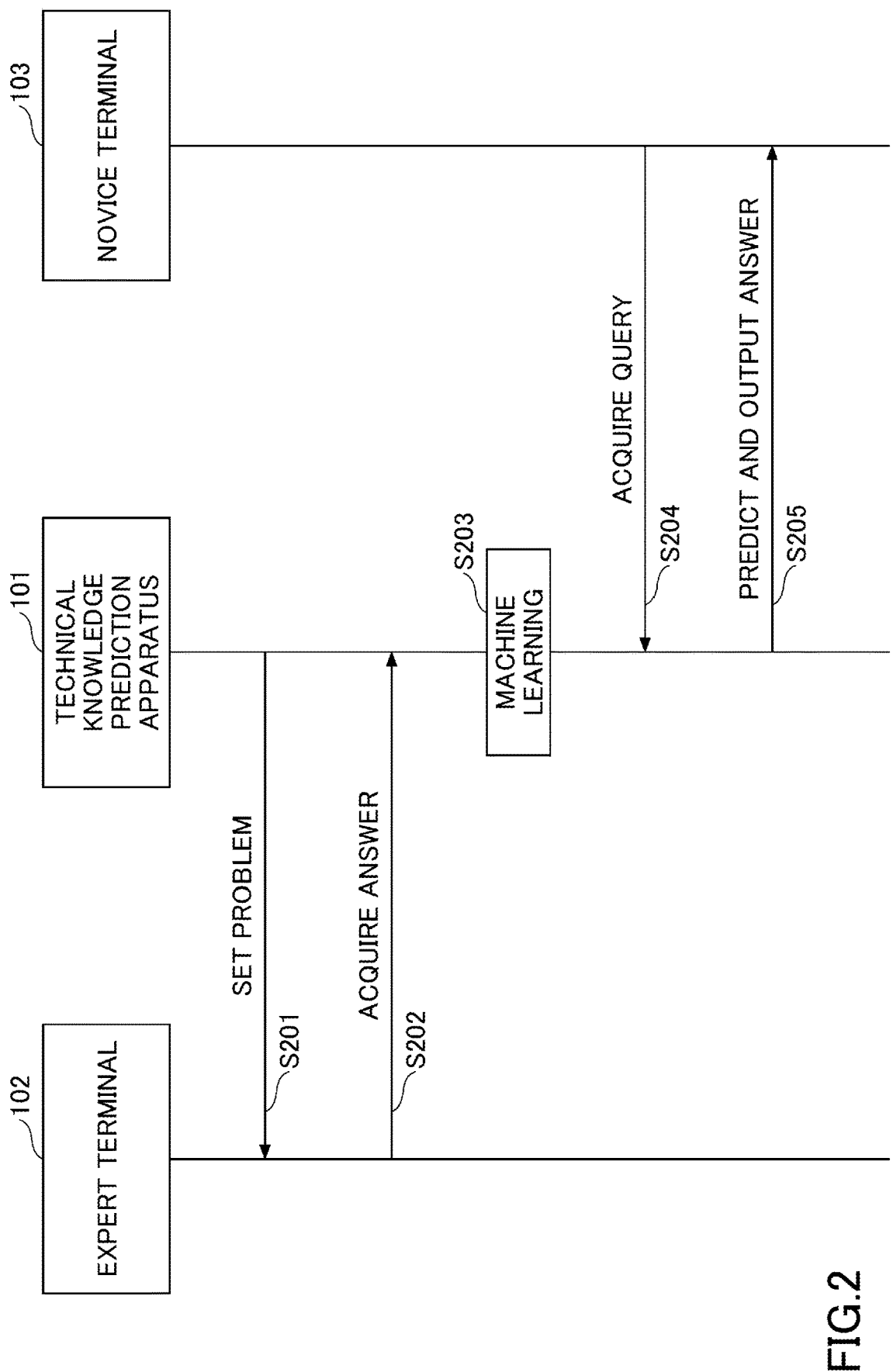
FIG. 2 is a sequence diagram of a technical knowledge prediction system according to one embodiment of the present invention.

FIG. 2 is a sequence diagram of the technical knowledge prediction system 100 according to one embodiment of the present invention. As illustrated in FIG. 2, the technical knowledge prediction apparatus 101 is an apparatus for automatically creating and setting a problem to the expert terminal 102 (S201), and acquiring an answer with respect to the problem from the expert terminal 102 (S202). In addition, the technical knowledge prediction apparatus 101 may also perform a machine learning based on the problem set to the expert terminal 102 and the answer acquired from the expert terminal 102, and generate a trained model which is used to predict the answer with respect to a query from the novice terminal 103 (S203). Further, the technical knowledge prediction apparatus 101 is an apparatus for acquiring the query from the novice terminal 103 (S204), and predicting and outputting an answer with respect to the query to the novice terminal 103 (S205). The technical knowledge prediction apparatus 101 will be described later in detail, by referring to FIG. 3 and FIG. 4.

The expert terminal 102 is a terminal used by a person who inputs the answer with respect to the problem set by the technical knowledge prediction apparatus 101. More particularly, the expert terminal 102 may receive data of the problem from the technical knowledge prediction apparatus 101, and display the data on the expert terminal 102 or on a display device (not illustrated) connected to the expert terminal 102 (S201). The expert terminal 102 may transmit data of the answer input to the expert terminal 102, with respect to the problem set by the technical knowledge prediction apparatus 101, to the technical knowledge prediction apparatus 101 (S202). An expert may answer the problem from the technical knowledge prediction apparatus 101, based on the expert's own experience, technical knowledge, know-how, or the like. The expert terminal 102 may be a computer, such as a personal computer or the like, for example.

The novice terminal 103 is a terminal used by a person who wishes to make a query with respect to the technical knowledge prediction apparatus 101. More particularly, the novice terminal 103 may transmit data of the query input to the novice terminal 103, to the technical knowledge prediction apparatus 101 (S204). In addition, the novice terminal 103 may receive data of the answer predicted by the technical knowledge prediction apparatus 101, from the technical knowledge prediction apparatus 101 (S205). The answer with respect to the query is predicted and reproduced based on the problem to the expert and the answer from expert. For this reason, the novice may obtain the answer which is as if predicted by the expert, by making the query with respect to the technical knowledge prediction apparatus 101. The novice terminal 103 may be a computer, such as a personal computer or the like, for example.

In this specification, although the expert terminal 102 and the novice terminal 103 are described as separate computers, the expert terminal 102 and the novice terminal 103 may be implemented in a single computer. In addition, the technical knowledge prediction apparatus 101 may include some or all of the functions of the expert terminal 102. Moreover, the technical knowledge prediction apparatus 101 may include some or all of the functions of the novice terminal 103.

<Hardware Configuration of Technical Knowledge Prediction Apparatus 101>

Figure 3:
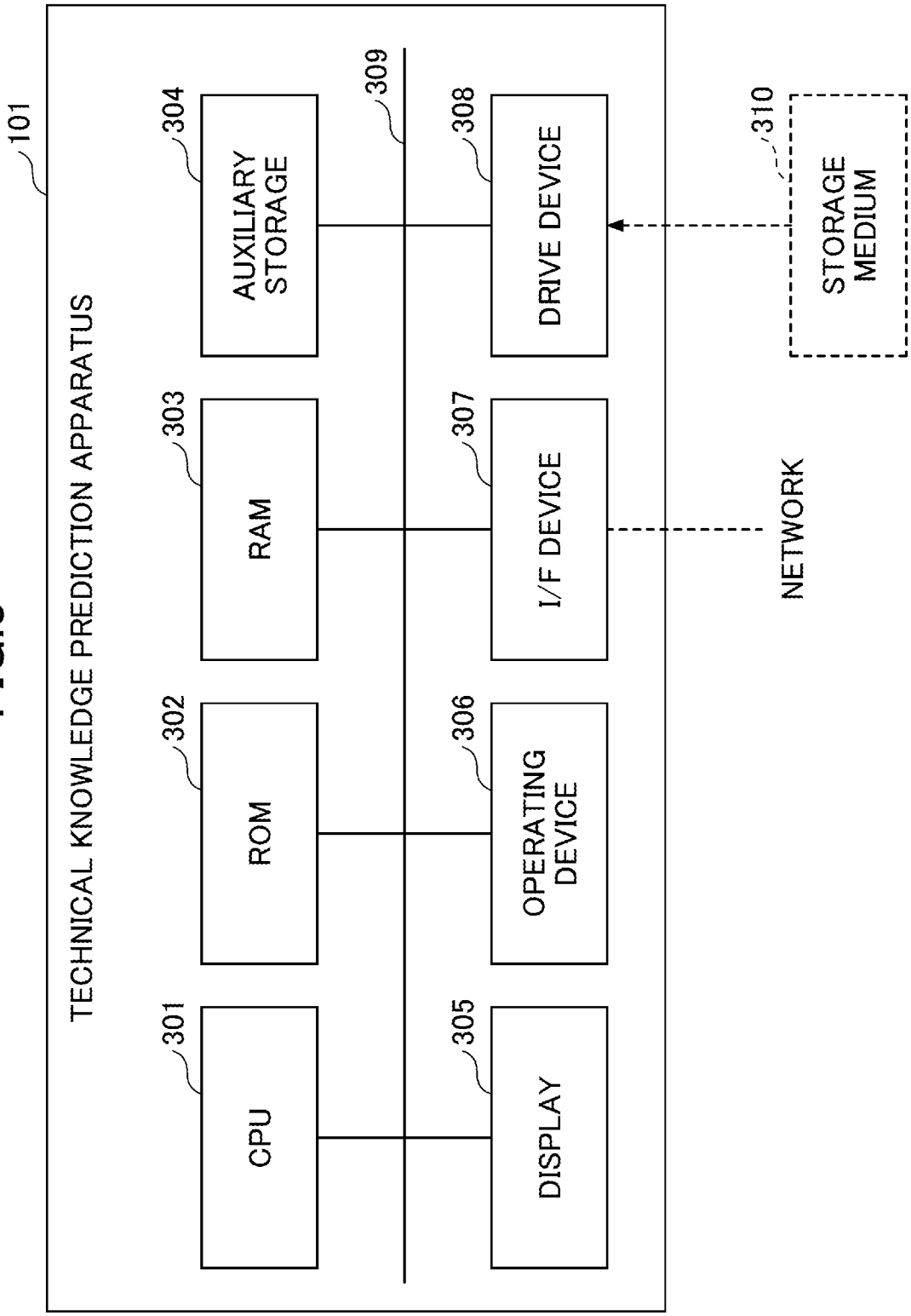
FIG. 3 is a diagram illustrating a hardware configuration of the technical knowledge prediction apparatus according to one embodiment of the present invention.

FIG. 3 is a diagram illustrating a hardware configuration of the technical knowledge prediction apparatus 101 according to one embodiment of the present invention. The technical knowledge prediction apparatus 101 includes a Central Processing Unit (CPU) 301, a Read Only Memory (ROM) 302, and a Random Access Memory (RAM) 303. The CPU 301, the ROM 302, and the RAM 303 form a so-called computer.

In addition, the technical knowledge prediction apparatus 101 includes an auxiliary storage 304, a display 305, an operating device 306, an interface (I/F) device 307, and a drive device 308. The hardware elements of the technical knowledge prediction apparatus 101 are connected to each other via a bus 309.

The CPU 301 is a processor which executes various programs installed in the auxiliary storage 304.

The ROM 302 is a non-volatile memory. The ROM 302 functions as a main storage for storing various programs, data, or the like required for the CPU 301 to execute the various programs installed in the auxiliary storage 304.

More particularly, the ROM 302 functions as the main storage for storing a boot program or the like, such as a BIOS (Basic Input/Output System), an EFI (Extensible Firmware Interface), or the like.

The RAM 303 is a volatile memory, such as a Dynamic Random Access Memory (DRAM), a Static Random Access Memory (SRAM), or the like. The RAM 303 functions as the main storage for providing a work area where the various programs installed in the auxiliary storage 304 are deployed when the CPU 301 executes the various programs.

The auxiliary storage 304 is an auxiliary storage device for storing the various programs, and information used when executing the various programs.

The display 305 is a display device for displaying an internal state or the like of the technical knowledge prediction apparatus 101.

The operating device 306 is an input device used by an administrator of the technical knowledge prediction apparatus 101 to input various instructions with respect to the technical knowledge prediction apparatus 101.

The I/F device 307 is a communication device for connecting to the network 104, and communicating with the expert terminal 102 and the novice terminal 103.

The drive device 308 is a device for setting the storage medium 310. The storage medium 310 may include media for optically, electrically, or magnetically recording information, such as a CD-ROM, a flexible disk, a magneto-optical disk, or the like. In addition, the storage medium 310 may include a semiconductor memory or the like for electrically recording information, such as a ROM, a flash memory, or the like.

For example, the various programs installed in the auxiliary storage 304 may be installed when the storage medium 310, which is distributed, is set in the drive device 308, and the various programs recorded in the storage medium 310 are read out by the drive device 308. Alternatively, the various programs installed in the auxiliary storage 304 may be installed by being downloaded from another network which is different from the network 104, via the I/F device 307.

<Functional Blocks of Technical Knowledge Prediction Apparatus 101>

Figure 4:
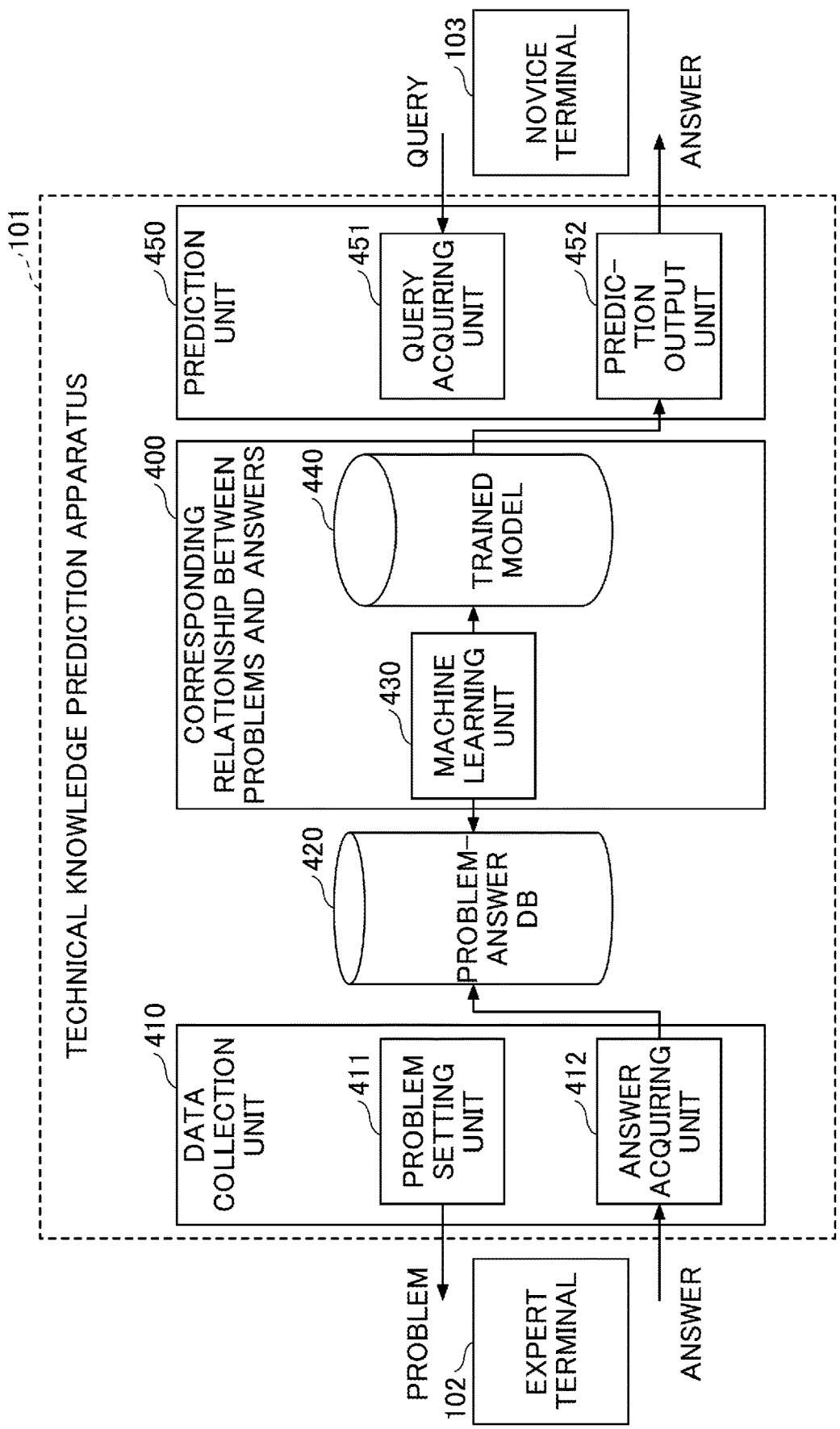
FIG. 4 is a diagram illustrating functional blocks of the technical knowledge prediction apparatus according to one embodiment of the present invention.

FIG. 4 is a diagram illustrating functional blocks of the technical knowledge prediction apparatus 101 according to one embodiment of the present invention. The technical knowledge prediction apparatus 101 includes a data collection unit 410 including a problem setting unit 411 and an answer acquiring unit 412, a problem-answer database (DB) 420, a corresponding relationship 400 between problems and answers, and a prediction unit 450 including a query acquiring unit 451 and a prediction output unit 452. The corresponding relationship 400 between the problems and the answers may include a machine learning unit 430 and a trained model 440. In addition, in a case where the corresponding relationship 400 between the problems and the answers includes the machine learning unit 430 and the trained model 440, the technical knowledge prediction apparatus 101 may function as the data collection unit 410, the machine learning unit 430, and the prediction unit 450, by executing programs. Each of these elements will be described below.

The problem setting unit 411 may automatically create the problem, and set the problem to the expert terminal 102. The created problem includes a control factor in the manufacturing process, and a variable of this control factor. One or a plurality of control factors are included in one problem.

Next, the "control factor" and the "variable" will be described. The "control factor" is an element which influences the answer with respect to the problem. For example, if the problem queries whether or not the manufacturing step can be performed, the control factor is an element which influences whether or not the manufacturing step can be performed. The control factor is represented by the "variable". The variable simply needs to represent the variability of the control factor, and is not limited to a numerical value. Hence, the answer with respect to the problem depends on the variable of the control factor.

In an example where an aluminum alloy is manufactured, the control factor is a composition of the aluminum alloy material, for example. In a case where the composition of the aluminum alloy material is the control factor, the variable of the control factor may be the percent by mass (mass %) of each component (for example, the element types such as Si, Fe, Cu, Mn, Mg, Cr, Ni, Zn, Ti, Na, V, Pb, Sn, B, Bi, Zr, O, or the like). In this case, the percent by mass (mass %) of aluminum may be expressed as 100−(a sum of percents by mass of the above described elements). In addition, the control factor may be a manufacturing condition of the aluminum alloy material. In this case, the manufacturing condition of the aluminum alloy material may be a cooling rate of casting, tempering (processing pattern of manufacture), temperature and retention time of each process (annealing, solution heat treatment, artificial age hardening process, natural aging, hot working process, cold working process, stabilizing treatment), processing condition (reduction ratio, pushing ratio, reduction of area, product shape, or the like), for example.

The description will return to that of the problem setting unit 411. The problem setting unit 411 may automatically create the problem without human intervention. The problem setting unit 411 may automatically create the problem by any means.

The problem setting unit 411 may determine the control factor of the problem, based on an instruction from an arbitrary terminal. The problem setting unit 411 may determine the value of the variable of the determined control factor. For example, the problem setting unit 411 may randomly determine (determine at random) the value of the variable. In addition, the problem setting unit 411 may determine a value registered in an arbitrary database (for example, a database registered with various elemental compositions of various materials are registered), as the value of the variable, for example. Further, the problem setting unit 411 may determine the value of the variable within a predetermined range based on an instruction from an arbitrary terminal, for example. The problem setting unit 411 may transmit the data of one or a plurality of problems that are created, to the expert terminal 102. The problem setting unit 411 may store the data of the problems in the memory, so that the answer acquiring unit 412 may make a reference thereto.

When the variable of the control factor is a numerical value, the numerical value prepared by a method, such as using a random number, using a value based on a database, using a random number or a numerical value acquired at constant intervals within a predetermined numerical range, or the like, may be used as the variable of the control factor. When the variable of the control factor is other than the numerical value, such as when the control factor is the product shape described above, for example, the shape prepared by a method, such as using a shape contained in a catalog or database, using a shape in which elements of a reference shape, such as points, sides, surfaces, of the like are gradually changed under a predetermined condition, or the like, may be used as the variable of the control factor.

The answer acquiring unit 412 may acquire the answer with respect to the problem set by the problem setting unit 411. More particularly, the answer acquiring unit 412 may receive the data of the answer with respect to the problem set by the problem setting unit 411, input to the expert terminal 102 from the expert terminal 102. The answer acquiring unit 412 may store a pair of the data of the problem set by the problem setting unit 411, and the data of the answer acquired by the answer acquiring unit 412, in the problem-answer DB 420.

The problem-answer DB 420 stores the pair of the data of the problem set by the problem setting unit 411, and the data of the answer acquired by the answer acquiring unit 412. The problem-answer DB 420 will be described in detail, by referring to FIG. 5.

FIG. 5 is a diagram illustrating an example of the data stored in the problem-answer DB 420 according to one embodiment of the present invention. As illustrated in FIG. 5, the data of "control factor", "variable", and "answer" are stored in the problem-answer DB 420 for each "problem".

The "problem" is the problem set by the problem setting unit 411. The problem may be "can the first step be performed?", "can the second step be performed?", . . . , and "can the nth step be performed?", for example. Each of the manufacturing steps may be casting, forging, extruding, rolling, or the like, for example.

The "control factor" is an element included in the problem and influencing the answer. The control factor is the condition of material, for example. In addition, the control factor is the condition of the manufacturing process (that is, the condition when the manufacturing step is performed), for example. For example, if the problem queries whether or not the casting of the aluminum alloy material can be performed, the control factor may be the elemental composition, billet diameter, molten metal temperature, casting rate, cooling rate, or the like. Moreover, if the problem queries whether or not the forging of the aluminum alloy material can be performed, for example, the control factor may be the elemental composition, product shape, mold temperature, material temperature, or the like. Further, if the problem queries whether or not to implement extrusion of the aluminum alloy material, for example, the control factor may be the elemental composition of the aluminum alloy material, the billet diameter, the product shape, the billet temperature, the extrusion rate, the extrusion pressure, or the like. If the problem queries whether or not the rolling of the aluminum alloy material can be performed, the control factor may be the elemental composition, processing temperature, reduction ratio, or the like.

The "variable" is the value of the variable of the control factor included in the problem. As described above, the variable may be the numerical value, or other than the numerical value, which can represent the variability of the control factor (for example, the product shape).

The "answer" is the answer acquired by the answer acquiring unit 412. The answer indicates whether or not the manufacturing step can be performed (for example, that the manufacturing step can be performed, or cannot be performed). The answer may include a probability that this answer is acquired, such as a probability that the manufacturing step can be performed, a probability that the manufacturing step cannot be performed, or the like.

Each problem may include a control factor according to the problem. In other words, each of the problems may have mutually different control factors. In the example illustrated in FIG. 5, a problem 1 and a problem 2 (decision of casting) include a control factor 3 (molten metal temperature) but do not include a control factor 4 (mold temperature). On the other hand, a problem 3 (decision of forging) does not include the control factor 3 (molten metal temperature), but includes the control factor 4 (mold temperature). In addition, each of the problems may include mutually the same control factors, as in the case of the problems 1 through 3 respectively including the control factors 1 and 2 (material).

The description will return to that of FIG. 4. If the corresponding relationship 400 between the problem and the answer is formed by the machine learning unit 430 and the trained model 440, the machine learning unit 430 may perform the machine learning based on the data stored in the problem-answer DB 420, and generate the trained model 440 which is used to predict the answer with respect to the query from the novice terminal 103. More particularly, the machine learning unit 430 may perform a machine learning using training data, including input data which is "problem set by the problem setting unit 411", and output data which is "answer acquired by the answer acquiring unit 412 with respect to the problem", and generate the trained model 440.

The trained model 440 is "a corresponding relationship between the problem, and the answer with respect to the problem" generated by the machine learning unit 430 by performing the machine learning. By automatically creating a large number of problems by the problem setting unit 411, setting the problems to the expert terminal 102, and acquiring answers with respect to the problems from the expert terminal 102, it is possible to build the corresponding relationship to a level which cannot be achieved by setting a few problems from a person skilled in the art.

Instead of using the machine learning, the technical knowledge prediction apparatus 101 may use a rule-based system (that is, "a corresponding relationship between the problem, and the answer with respect to the problem" specified by a person based on a pair of the data of the problem set by the problem setting unit 411 and the data of the answer with respect to the problem acquired by the acquiring unit 412). In other words, the technical knowledge prediction apparatus 101 may predict the answer based on the trained model 440 generated by the machine learning, or predict the answer based on the rule-based system.

Even if a person tries to find a rule by viewing the input data or performing a statistical processing of the data, it may be that the rule is too complex to be found, and thus, it is preferable to use the trained model obtained by the machine learning.

The query acquiring unit 451 may acquire the query. More particularly, the query acquiring unit 451 may receive from the novice terminal 103 the data of the query input to the novice terminal 103. In addition, the query acquiring unit 451 may store the data of the query in the memory, so that the prediction output unit 452 may make a reference thereto.

The prediction output unit 452 may predict and output the answer with respect to the query acquired by the query acquiring unit 451. More particularly, the prediction output unit 452 may predict the answer based on the query acquired by the query acquiring unit 451, and the "corresponding relationship between the problem, and the answer with respect to the problem". For example, the prediction output unit 452 may output, as the predicted answer, the output data of the trained model 440 when the query acquired by the query acquiring unit 451 is input to the trained model 440. In addition, the prediction output unit 452 may output, as the predicted answer, the answer which is based on the rule-based system (that is, "a corresponding relationship between the problem, and the answer with respect to the problem" specified by a person), for example. The prediction output unit 452 may transmit the data of the predicted answer to the novice terminal 103.

The prediction output unit 452 may predict and output a comprehensive answer based on a plurality of answers. For example, the query acquired by the query acquiring unit 451 may query a decision of manufacture (that is, a decision of performing each of the manufacturing steps) under conditions of specific materials and conditions of specific manufacturing processes. In this case, the prediction output unit 452 predicts the answer to the decision of performing each of the manufacturing steps under the conditions of the specific materials and the conditions of the specific manufacturing processes (that is, a decision of performing a first step, a decision of performing a second step, . . . , and a decision of performing an nth step). Hence, the prediction output unit 452 can predict the comprehensive answer (that is, the answer to the decision of manufacture), based on each of the predicted answers. In this example, manufacture is possible if all of the manufacturing steps can be performed, and manufacture is not possible if at least one manufacturing step cannot be performed. The comprehensive answer may include a probability (for example, a probability that the manufacture is possible), which is a comprehensive answer, calculated based on a probability of the answer for each of the manufacturing steps (for example, a probability that the first step can be performed, a probability that the second step can be performed, . . . , and a probability that the nth step can be performed). A prediction example of the decision of manufacture will be described, by referring to FIG. 6.

FIG. 6 is a diagram illustrating a prediction example 600 of the decision of manufacture according to one embodiment of the present invention. As illustrated in FIG. 6, the casting is possible but the forging is not possible under the conditions of the specific materials (Si is ○○ %, and Cu is ΔΔ %) and the conditions of the specific manufacturing processes (molten metal temperature is ○○ ° C., and mold temperature is XXX° C.). In this case, the prediction output unit 452 can predict and output the comprehensive answer indicating that the manufacture is not possible when queried on the decision of manufacture under the conditions of the specific materials (Si is ○○ %, and Cu is ΔΔ %) and the conditions of the specific manufacturing processes (molten metal temperature is ○○○ ° C., and mold temperature is xxx° C.).

Figure 7:
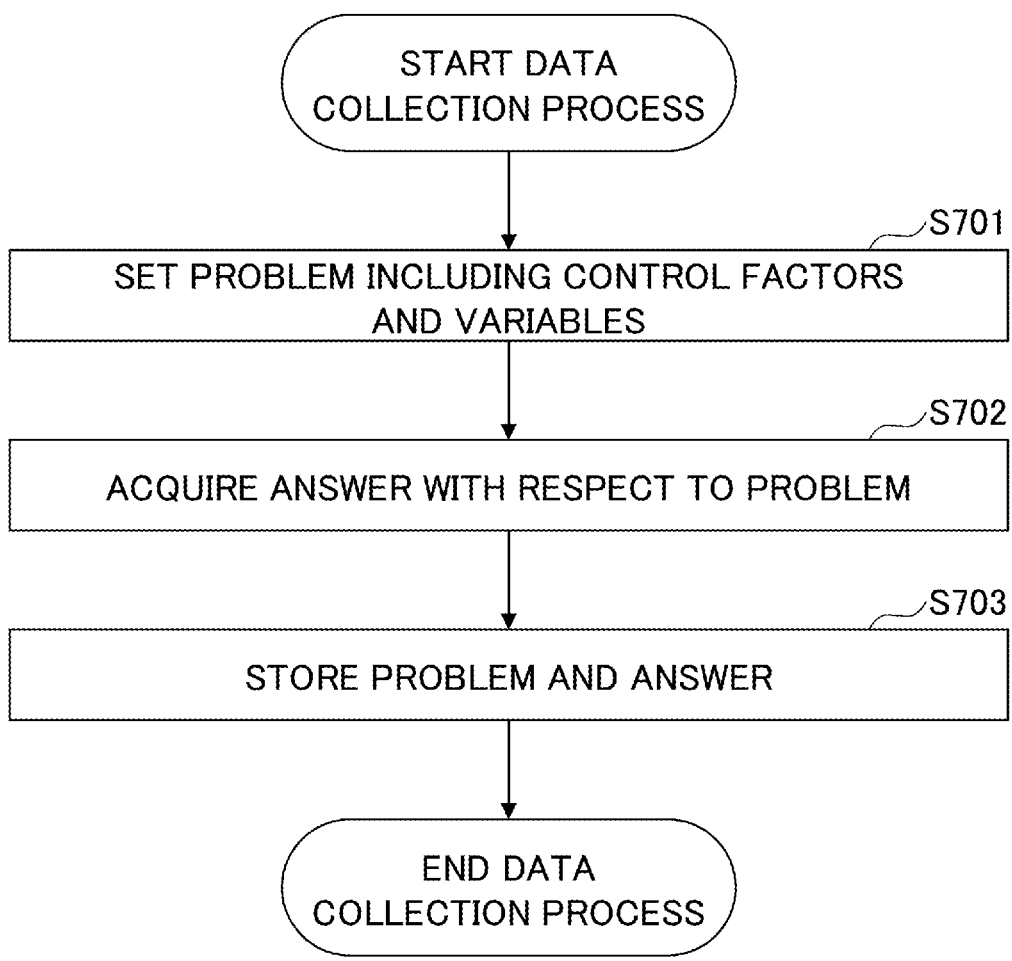
FIG. 7 is a flow chart illustrating a flow of a data collection process according to one embodiment of the present invention.

FIG. 7 is a flow chart illustrating a flow of a data collection process according to one embodiment of the present invention.

In step S701, the problem setting unit 411 may automatically create a problem including control factors and variables, and set the problem to the expert terminal 102.

In step S702, the answer acquiring unit 412 may acquire an answer with respect to the problem set in step S701 from the expert terminal 102.

In step S703, the answer acquiring unit 412 may store a pair of the data of the problem set in step S701, and the data of the answer acquired in step S702.

Figure 8:
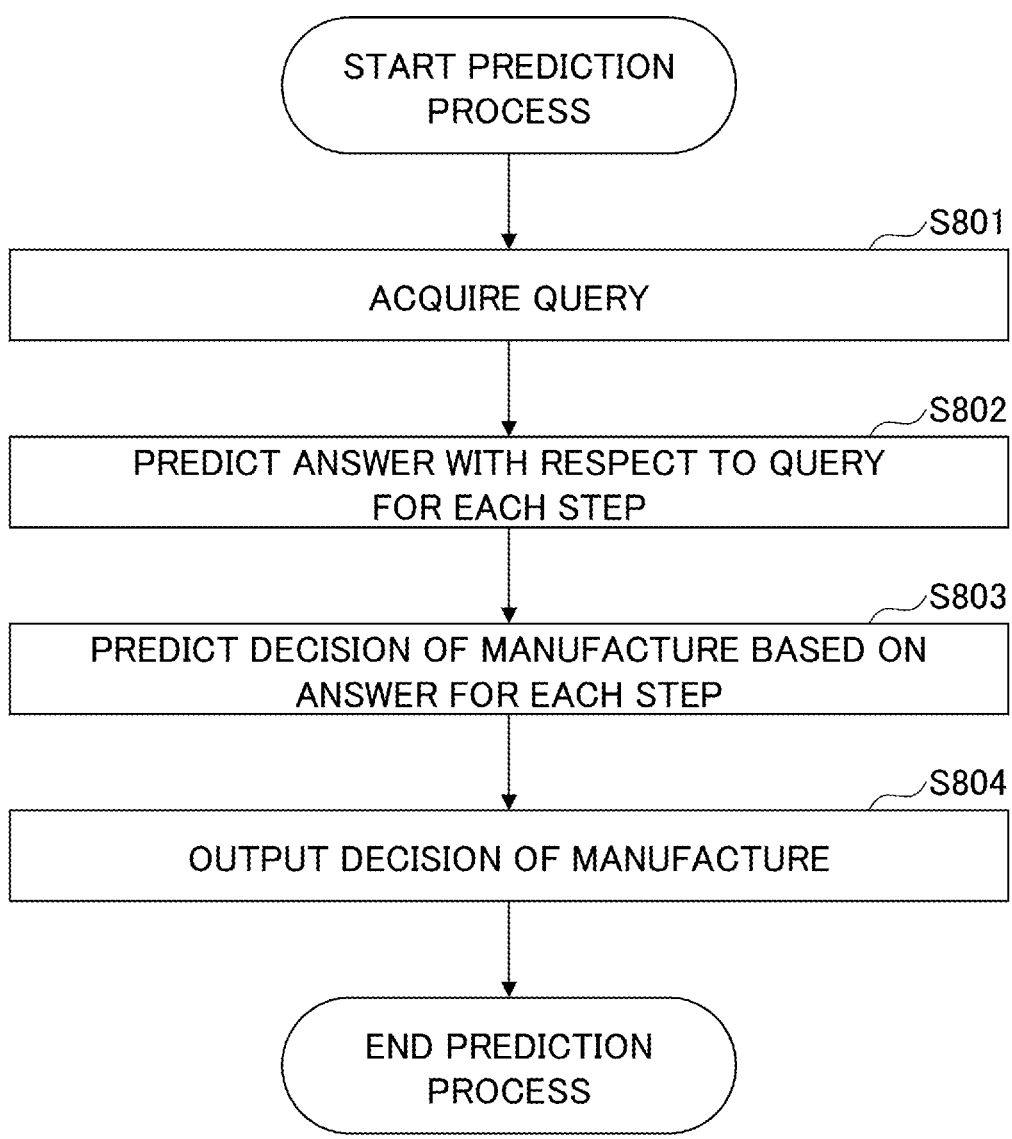
FIG. 8 is a flow chart illustrating a flow of a prediction process according to one embodiment of the present invention.

FIG. 8 is a flow chart illustrating a flow of a prediction process according to one embodiment of the present invention.

In step S801, the query acquiring unit 451 may acquire a query from the novice terminal 103.

In step S802, the prediction output unit 452 may predict an answer for each of the manufacturing steps (for example, an answer for the first step, an answer for the second step, . . . , and an answer for the nth step) with respect to the query acquired in step S801.

In step S803, the prediction output unit 452 may predict a comprehensive answer (for example, an answer for the decision of manufacture), based on the answers for each of the manufacturing steps predicted in step S802.

In step S804, the prediction output unit 452 may transmit the data of the comprehensive answer (for example, the answer for the decision of manufacture) predicted in step S803 to the novice terminal 103.

FIG. 9 is an example of a screen displayed on the expert terminal 102 according to one embodiment of the present invention. The expert may view the problem (that is, the control factors and the variables) displayed on the screen, and input the answer (that is, the decision of manufacture).

The conditions of the materials (in the example illustrated in FIG. 9, the added content of each of the elements) may be displayed as the problem (that is, the control factors and the variables), as illustrated in FIG. 9. The conditions of the manufacturing processes (for example, predetermined standard conditions) may be displayed, as the problem (that is, the control factors and the variables).

The expert may select an answer from a plurality of selectable choices (double circles, circles, triangles, and crosses in the example illustrated in FIG. 9), as illustrated in FIG. 9. As described above, the answer acquired by the answer acquiring unit 412 may include a probability of the answer, such as the probability that the manufacturing step can be performed, the probability that the manufacturing step cannot be performed, or the like. For example, as illustrated in FIG. 9, the selectable choices of the answer may include, in addition to "the manufacturing step can be performed (double circle in FIG. 9)" and "the manufacturing step cannot be performed (cross in FIG. 9)", an answer in between the manufacturing step can be performed and the manufacturing step cannot be performed (for example, "highly possible that the manufacturing step can be performed (circle in FIG. 9)" and highly possible that the manufacturing step cannot be performed (triangle in FIG. 9)".

If the expert decides that the manufacturing step can be performed if the conditions of the manufacturing process (casting process) are changed, when selecting the answer that is in between the answer that the manufacturing step can be performed and the answer that the manufacturing step cannot be performed, the expert may specify the variables (for example, specify changes from standard conditions) which will enable the manufacturing step to be performed. In this case, the machine learning unit 430 may perform a machine learning, based on the problem set to the expert terminal 102, and the answer (including the variables specified by the expert which will enable the manufacturing step to be performed) acquired from the expert terminal 102, to generate a trained model which is used to predict the answer to the query from the novice terminal 103.

FIG. 10 is an example of a screen displayed on the novice terminal 103 according to one embodiment of the present invention. The novice can input the problem (that is, the control factors and the variables) on the screen, and view the predicted answer (that is, the decision of performing the manufacturing steps).

The novice may input the conditions of the materials (in the example illustrated in FIG. 10, the added content of each of the elements), as the problem (that is, the control factors and the variables). The conditions of the manufacturing processes (for example, predetermined standard conditions) may be input in advance, as the problem (that is, the control factors and the variables).

When the problem is input, the predicted answer and the probability of the answer may be displayed as the answer (that is, the decision of performing the manufacturing steps), as illustrated in FIG. 10. When the answer indicates that the manufacturing step can be performed if the variables of the control factors (in the example illustrated in FIG. 10, the conditions of the manufacturing process (casting conditions)) are changed, the predicted variables which enable the manufacturing step to be performed (for example, the changes from standard conditions) may be displayed.

Hence, in one embodiment of the present invention, the expert can reproduce and transmit the expert's technical knowledge as if inheriting the expert's technical knowledge to the next generation, by simply answering the problem from the technical knowledge prediction apparatus 101. In addition, the novice can obtain the answer which is reproduced as if predicted by the expert, by making the query to the technical knowledge prediction apparatus 101. In other words, the expert's technical knowledge (implicit knowledge, such as intuition or the like), which will be lost if no measures are taken, can be extracted by using the technical knowledge prediction apparatus 101 of the present invention, to be shared by the next generation.

The present invention is not limited to the configurations of the embodiments described above, and the configurations may be combined with other elements. In this respect, variations may be made without departing from the scope of the present invention, and the variations may be determined appropriately according to the applications.

DESCRIPTION OF THE REFERENCE NUMERALS

100 Technical knowledge prediction system
101 Technical knowledge prediction apparatus
102 Expert terminal
103 Novice terminal
104 Network
400 Corresponding relationship between problem and answer
410 Data collection unit
411 Problem setting unit
412 Answer acquiring unit
420 Problem-answer DB
430 Machine learning unit
440 Trained model
450 Prediction unit
451 Query acquiring unit
452 Prediction output unit
600 Prediction example of decision of manufacture

The invention claimed is:

1. A technical knowledge prediction apparatus comprising:
 a storage device configured to store a program; and
 a processor configured to execute the program, and perform a process including
  creating and setting a problem which includes a control factor of a manufacturing step of an alloy material, and a variable of the control factor, wherein
   the problem queries whether or not the manufacturing step of the alloy material can be performed,
   the control factor relates to conditions of the alloy material and the manufacturing step thereof, including a composition of the alloy material, and
   the variable includes a percent by mass of each component of the alloy material;
  acquiring an answer with respect to the problem and indicating a decision of the manufacturing step, wherein the answer indicates whether or not the manufacturing step of the alloy material can be performed;
  acquiring a query; and
  predicting and outputting an answer corresponding to the query acquired by the acquiring the query, based on a corresponding relationship between the problem and the answer, wherein the corresponding relationship between the problem and the answer is a trained model generated by a machine learning using the problem set by the creating and setting, and the answer acquired by the acquiring the answer, as training data.

2. The technical knowledge prediction apparatus as claimed in claim 1, wherein the creating and setting determines a value of the variable of the control factor.

3. The technical knowledge prediction apparatus as claimed in claim 1, wherein, when the answer indicates that the manufacturing step can be performed if the variable of the control factor is changed, the predicting and outputting displays a predicted variable which enables the manufacturing step to be performed.

4. The technical knowledge prediction apparatus as claimed in claim 1, wherein the predicting and outputting outputs a prediction of a decision of manufacture based on a plurality of predicted answers.

5. The technical knowledge prediction apparatus as claimed in claim 4, wherein, when the answer indicates that the manufacturing step can be performed if the variable of the control factor is changed, the predicting and outputting displays a predicted variable which enables the manufacturing step to be performed.

6. The technical knowledge prediction apparatus as claimed in claim 1, wherein the creating and setting determines the value of the variable of the control factor to one of a random value, a registered value in a database registered with various elemental compositions of various materials, and a value within a predetermined range, based on an instruction.

7. The technical knowledge prediction apparatus as claimed in claim 1, wherein:
 the acquiring the answer includes:
  displaying the conditions of the alloy material and the manufacturing step thereof as the control factor of the problem, and an answer selectable from a plurality of selectable choices including whether or not the manufacturing step can be performed, on a first display of a first terminal, and
  acquiring the answer selected from the first terminal,
 the acquiring the query includes acquiring the query from a second terminal different from the first terminal, and
 the predicting and outputting includes:
  displaying a predicted answer and a probability that the manufacturing step can be performed, as the answer corresponding to the query, on a second display of the second terminal, and
  displaying a predicted variable which enables the manufacturing step to be performed when the answer indicates that the manufacturing step can be performed if the variable of the control factor is changed, on the second display.

8. A method to be executed by a computer, comprising:
creating and setting a problem which includes a control factor of a manufacturing step of an alloy material, and a variable of the control factor, wherein
the problem queries whether or not the manufacturing step of the alloy material can be performed,
the control factor relates to conditions of the alloy material and the manufacturing step thereof, including a composition of the alloy material, and
the variable includes a percent by mass of each component of the alloy material;
acquiring an answer with respect to the problem and indicating a decision of the manufacturing step, wherein the answer indicates whether or not the manufacturing step of the alloy material can be performed;
acquiring a query; and
predicting and outputting an answer corresponding to the query acquired by the acquiring the query, based on a corresponding relationship between the problem and the answer, wherein the corresponding relationship between the problem and the answer is a trained model generated by a machine learning using the problem set by the creating and setting, and the answer acquired by the acquiring the answer, as training data.

9. The method as claimed in claim 8, wherein the creating and setting determines a value of the variable of the control factor.

10. The method as claimed in claim 8, wherein the predicting and outputting outputs a prediction of a decision of manufacture based on a plurality of predicted answers.

11. The method as claimed in claim 8, wherein, when the answer indicates that the manufacturing step can be performed if the variable of the control factor is changed, the predicting and outputting displays a predicted variable which enables the manufacturing step to be performed.

12. The method as claimed in claim 8, wherein the creating and setting determines the value of the variable of the control factor to one of a random value, a registered value in a database registered with various elemental compositions of various materials, and a value within a predetermined range, based on an instruction.

13. The method as claimed in claim 8, wherein:
the acquiring the answer includes:
displaying the conditions of the alloy material and the manufacturing step thereof as the control factor of the problem, and an answer selectable from a plurality of selectable choices including whether or not the manufacturing step can be performed, on a first display of a first terminal, and
acquiring the answer selected from the first terminal,
the acquiring the query includes acquiring the query from a second terminal different from the first terminal, and
the predicting and outputting includes:
displaying a predicted answer and a probability that the manufacturing step can be performed, as the answer corresponding to the query, on a second display of the second terminal, and
displaying a predicted variable which enables the manufacturing step to be performed when the answer indicates that the manufacturing step can be performed if the variable of the control factor is changed, on the second display.

14. A non-transitory computer-readable storage medium having stored therein a program which, when executed by a computer, causes the computer to perform a process comprising:
creating and setting a problem which includes a control factor of a manufacturing step of an alloy material, and a variable of the control factor, wherein
the problem queries whether or not the manufacturing step of the alloy material can be performed,
the control factor relates to conditions of the alloy material and the manufacturing step thereof, including a composition of the alloy material, and
the variable includes a percent by mass of each component of the alloy material;
acquiring an answer with respect to the problem and indicating a decision of the manufacturing step, wherein the answer indicates whether or not the manufacturing step of the alloy material can be performed;
acquiring a query; and
predicting and outputting an answer corresponding to the query acquired by the acquiring the query, based on a corresponding relationship between the problem and the answer, wherein the corresponding relationship between the problem and the answer is a trained model generated by a machine learning using the problem set by the creating and setting, and the answer acquired by the acquiring the answer, as training data.

15. The non-transitory computer-readable storage medium as claimed in claim 14, wherein the creating and setting determines a value of the variable of the control factor.

16. The non-transitory computer-readable storage medium as claimed in claim 14, wherein the predicting and outputting outputs a prediction of a decision of manufacture based on a plurality of predicted answers.

17. The non-transitory computer-readable storage medium as claimed in claim 14, wherein, when the answer indicates that the manufacturing step can be performed if the variable of the control factor is changed, the predicting and outputting displays a predicted variable which enables the manufacturing step to be performed.

18. The non-transitory computer-readable storage medium as claimed in claim 14, wherein the creating and setting determines the value of the variable of the control factor to one of a random value, a registered value in a database registered with various elemental compositions of various materials, and a value within a predetermined range, based on an instruction.

* * * * *